(12) United States Patent
Isaka et al.

(10) Patent No.: US 8,275,251 B2
(45) Date of Patent: Sep. 25, 2012

(54) INTERCHANGEABLE LENS, CAMERA BODY, AND CAMERA SYSTEM

(75) Inventors: Haruo Isaka, Kyoto (JP); Mitsuyoshi Okamoto, Osaka (JP); Kenji Kawazoe, Hyogo (JP); Naotake Kitahira, Osaka (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/935,357

(22) PCT Filed: Apr. 15, 2009

(86) PCT No.: PCT/JP2009/001738
§ 371 (c)(1),
(2), (4) Date: Dec. 21, 2010

(87) PCT Pub. No.: WO2009/128263
PCT Pub. Date: Oct. 22, 2009

(65) Prior Publication Data
US 2011/0091194 A1    Apr. 21, 2011

(30) Foreign Application Priority Data

Apr. 17, 2008  (JP) ................................ 2008-107680
May 30, 2008  (JP) ................................ 2008-141928

(51) Int. Cl.
*G03B 13/34* (2006.01)
(52) U.S. Cl. .......................................... 396/93; 396/136
(58) Field of Classification Search .................... 396/91, 396/93, 133, 135, 136
See application file for complete search history.

(56) References Cited

U.S. PATENT DOCUMENTS

| 5,153,629 A | 10/1992 | Kaneda |
| 5,387,960 A | 2/1995 | Hirasawa et al. |
| 5,604,560 A * | 2/1997 | Kaneda .................. 396/133 |
| 5,799,214 A * | 8/1998 | Iwane .................... 396/135 |
| 5,877,811 A | 3/1999 | Iijima et al. |
| 5,895,133 A | 4/1999 | Hirai |
| 6,989,865 B1 | 1/2006 | Ohta |
| 2006/0119732 A1 | 6/2006 | Ohta |
| 2008/0007644 A1* | 1/2008 | Matsumoto ............. 348/345 |
| 2008/0199170 A1 | 8/2008 | Shibuno et al. |

(Continued)

FOREIGN PATENT DOCUMENTS

JP    63-070834    3/1988
(Continued)

OTHER PUBLICATIONS

International Search Report of PCT Application No. PCT/JP2009/001738, dated Jul. 14, 2009.
(Continued)

*Primary Examiner* — W. B. Perkey
(74) *Attorney, Agent, or Firm* — Panasonic Patent Center; Dhiren Odedra; Kerry Culpepper

(57) ABSTRACT

An interchangeable lens includes a focus lens for changing a focus state of an object image, a driving unit for driving the focus lens, a lens controller for controlling the driving unit so as to move the focus lens forward and backward along the optical axis at a predetermined drive frequency, and a storage unit for storing therein drive frequency information representing a drive frequency at which the driving unit can control. A camera body obtains the drive frequency information from the interchangeable lens and performs control while referring to the drive frequency information.

10 Claims, 7 Drawing Sheets

U.S. PATENT DOCUMENTS

2009/0167878 A1* 7/2009 Kawazoe et al. .......... 348/208.5
2011/0080488 A1* 4/2011 Okamoto et al. .......... 348/220.1

FOREIGN PATENT DOCUMENTS

| JP | 4-273209 | 9/1992 |
| JP | 4-273226 | 9/1992 |
| JP | 4-273230 | 9/1992 |
| JP | 4-280239 | 10/1992 |
| JP | 10-133251 | 5/1998 |
| JP | 11-064720 | 3/1999 |
| JP | 11-183791 | 7/1999 |
| JP | 2006-146062 | 6/2006 |
| JP | 2007-060010 | 3/2007 |
| JP | 2007-074402 | 3/2007 |
| JP | 2007-219539 | 8/2007 |
| JP | 2007-322922 | 12/2007 |
| JP | 2007-334143 | 12/2007 |
| JP | 2008-015274 | 1/2008 |
| JP | 2008-242442 | 10/2008 |
| JP | 2008-276131 | 11/2008 |
| KR | 10-0360541 | 4/2003 |

OTHER PUBLICATIONS

The Extended European Search Report, Application No. EP 09 73 2795, dated Oct. 7, 2011.

Translation of International Preliminary Report on Patentability (PCT/IB/338) mailed on Dec. 16, 2010 with PCT/IPEA/409 for corresponding application PCT/JP2009/001738.

* cited by examiner

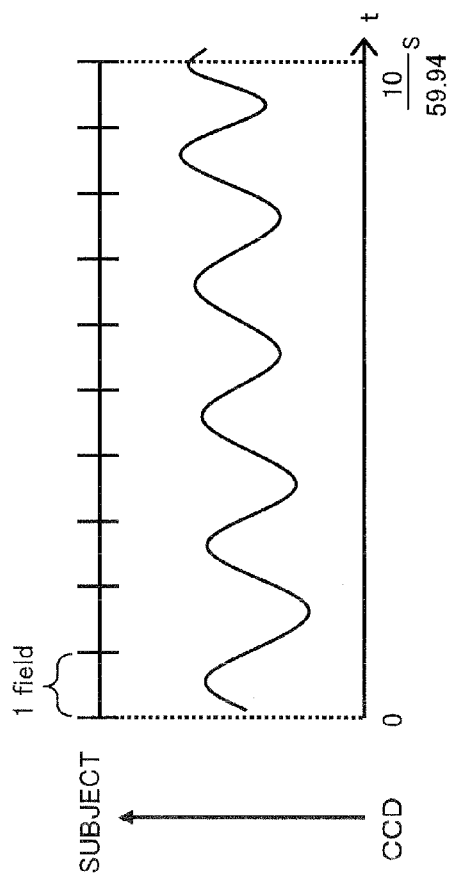
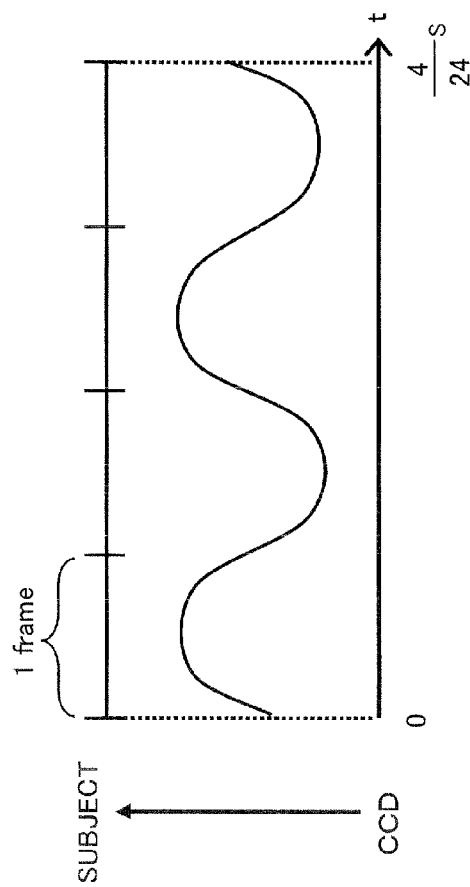
Fig. 2A
Fig. 2B

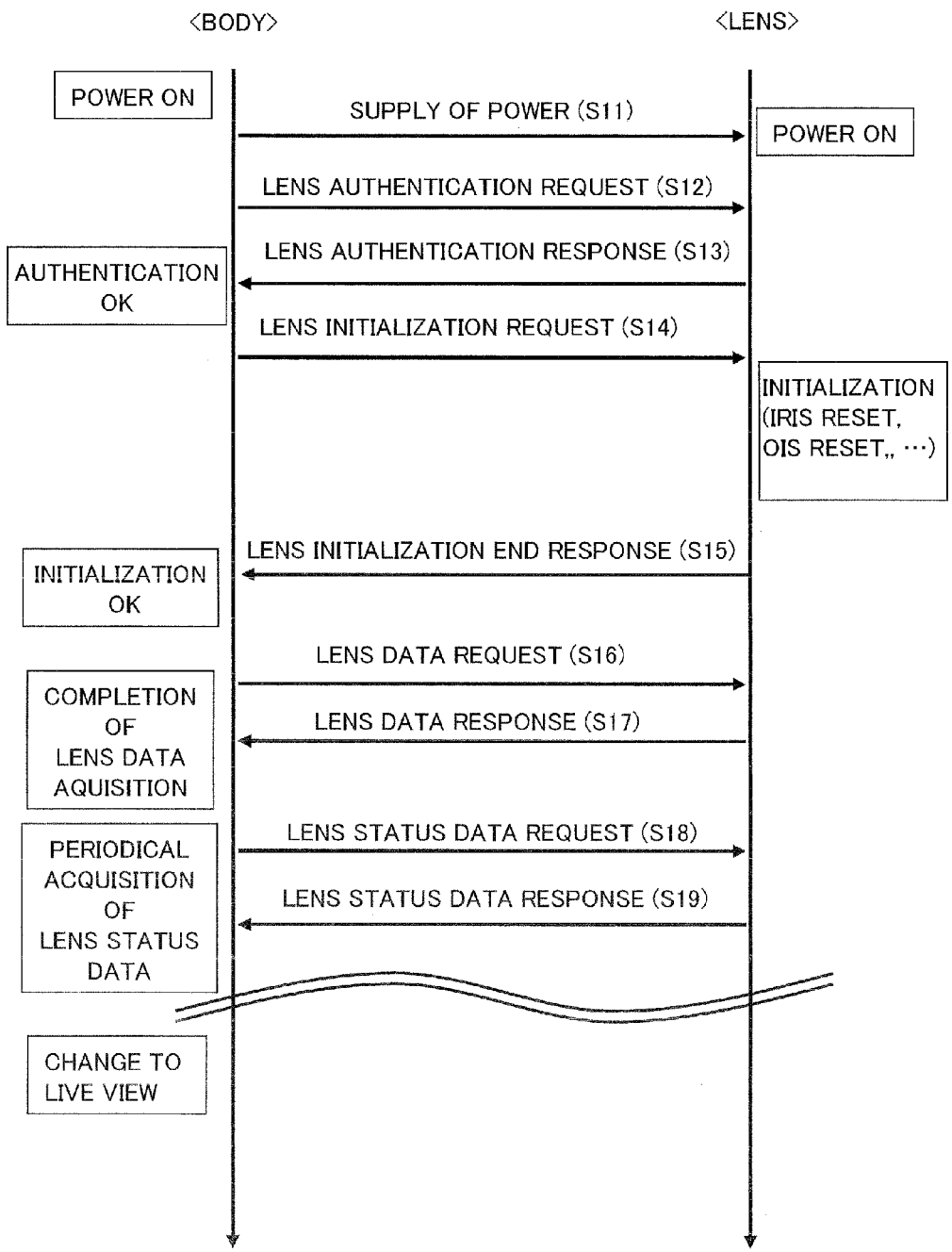

Fig. 7

| BIT | FLAG | VALUE |
|---|---|---|
| 1 | 30Hz CONTROL FREQUENCY SUPPORT FLAG | SUPPORT=1, NOT SUPPORT=0 |
| 2 | 60Hz CONTROL FREQUENCY SUPPORT FLAG | SUPPORT=1, NOT SUPPORT=0 |
| 3 | 120Hz CONTROL FREQUENCY SUPPORT FLAG | SUPPORT=1, NOT SUPPORT=0 |
| 4 | 240Hz CONTROL FREQUENCY SUPPORT FLAG | SUPPORT=1, NOT SUPPORT=0 |
| 5 | 25Hz CONTROL FREQUENCY SUPPORT FLAG | SUPPORT=1, NOT SUPPORT=0 |
| 6 | 50Hz CONTROL FREQUENCY SUPPORT FLAG | SUPPORT=1, NOT SUPPORT=0 |
| 7 | 100Hz CONTROL FREQUENCY SUPPORT FLAG | SUPPORT=1, NOT SUPPORT=0 |
| 8 | 200Hz CONTROL FREQUENCY SUPPORT FLAG | SUPPORT=1, NOT SUPPORT=0 |
| 9 | 24Hz CONTROL FREQUENCY SUPPORT FLAG | SUPPORT=1, NOT SUPPORT=0 |
| 10 | 48Hz CONTROL FREQUENCY SUPPORT FLAG | SUPPORT=1, NOT SUPPORT=0 |
| 11 | 96Hz CONTROL FREQUENCY SUPPORT FLAG | SUPPORT=1, NOT SUPPORT=0 |
| 12 | 192Hz CONTROL FREQUENCY SUPPORT FLAG | SUPPORT=1, NOT SUPPORT=0 |
| 13 | 1/2 WOBLING FREQUENCY SUPPORT FLAG | SUPPORT=1, NOT SUPPORT=0 |
| 14 | 1/4 WOBLING FREQUENCY SUPPORT FLAG | SUPPORT=1, NOT SUPPORT=0 |
| 15 | 1/8 WOBLING FREQUENCY SUPPORT FLAG | SUPPORT=1, NOT SUPPORT=0 |

INTERCHANGEABLE LENS, CAMERA BODY, AND CAMERA SYSTEM

TECHNICAL FIELD

The present invention relates to an interchangeable lens, a camera body, and a camera system. In particular, the present invention relates to an interchangeable lens, a camera body, and a camera system that can support capturing of a moving image.

BACKGROUND ART

Patent Document 1 discloses an interchangeable lens type camera. A lens unit mountable to the camera has drive systems related to autofocus adjustment, auto exposure control and the like. Further, the lens unit mountable to the camera has status information of the lens unit. With this camera device, communication is done between the camera and the lens unit to exchange a variety of control information and the status information, so that the lens unit is controlled from the camera side.

PRIOR ART DOCUMENT

Patent Document

Patent Document 1: JP 04-280239 A

DISCLOSURE OF INVENTION

Problems to be Solved by the Invention

As described above, Patent Document 1 discloses only the status information of the drive system related to the autofocus adjustment, the auto exposure control and the like as the information owned by the lens unit. However, with such a structure, when capturing a moving image at a predetermined frame rate, it is uncertain whether or not the lens unit is capable of accepting the control corresponding to the frame rate. Accordingly, with such a structure, control cannot correctly be exerted over the lens unit from the camera side in capturing a moving image.

An object of the present invention is to provide an interchangeable lens, a camera body, and a camera system, in which the interchangeable lens can be controlled correctly by the camera body in capturing a moving image.

Means for Solving the Invention

In a first aspect of the present invention, an interchangeable lens mountable to a camera body is provided. The interchangeable lens includes a focus lens configured to change a focus state of a subject image, a driving unit configured to drive the focus lens along an optical axis, a lens controller configured to control the driving unit to move the focus lens forward and backward at a predetermined drive frequency along the optical axis, and a storage unit configured to store drive frequency information indicating a drive frequency at which the driving unit can drive the focus lens.

In a second aspect of the present invention, a camera body to which an interchangeable lens is mountable is provided. The interchangeable lens includes a focus lens and storing drive frequency information indicative of a drive frequency for driving the focus lens. The camera body includes an imaging unit configured to capture a subject image at a predetermined imaging frequency, a receiving unit configured to receive an instruction as to the predetermined imaging frequency, an obtaining unit configured to obtain the drive frequency information from the interchangeable lens, and a body controller configured to refer to the drive frequency information obtained by the obtaining unit, determines whether the focus lens can be driven at a drive frequency corresponding to the predetermined imaging frequency indicated by the instruction received by the receiving unit, and control an operation of the camera body in accordance with a result of the determination.

In a third aspect of the present invention, a camera system including an interchangeable lens and a camera body is provided. The interchangeable lens includes a focus lens configured to change a focus state of a subject image, a driving unit configured to drive the focus lens along an optical axis, a lens controller configured to control the driving unit to move the focus lens forward and backward at a predetermined drive frequency along the optical axis, and a storage unit configured to store drive frequency information on a drive frequency at which the driving unit can drive the focus lens. The camera body includes an imaging unit configured to capture a subject image at a predetermined imaging frequency, a receiving unit configured to receive an instruction related to the predetermined imaging frequency, and a body controller configured to control the camera body. The body controller requests the drive frequency information from the lens controller. The lens controller sends the drive frequency information to the body controller in response to the request from the body controller. The body controller controls an operation of the camera body by referring to the received drive frequency information.

Effects of the Invention

According to the present invention, there can be provided an interchangeable lens, a camera body, and a camera system, in which the interchangeable lens can be controlled accurately by the camera body in capturing a moving image.

BRIEF DESCRIPTION OF DRAWINGS

FIGS. 2A and 2B are schematic diagrams for describing drive frequency information.

FIG. 3 is a diagram showing a transmission and reception sequence between a body and a lens in an imaging preparation operation.

FIG. 7 is a table for describing drive frequency information represented by ratio to the control frequency.

MODE FOR CARRYING OUT THE INVENTION

Hereinafter, an embodiment of the present invention will be described with reference to the accompanying drawings.

First Embodiment

Hereinafter, a first embodiment in which the present invention is applied to an interchangeable lens type camera system will be described with reference to the drawings.

1-1. Configuration

1-1-1. Overview

Figure 1:
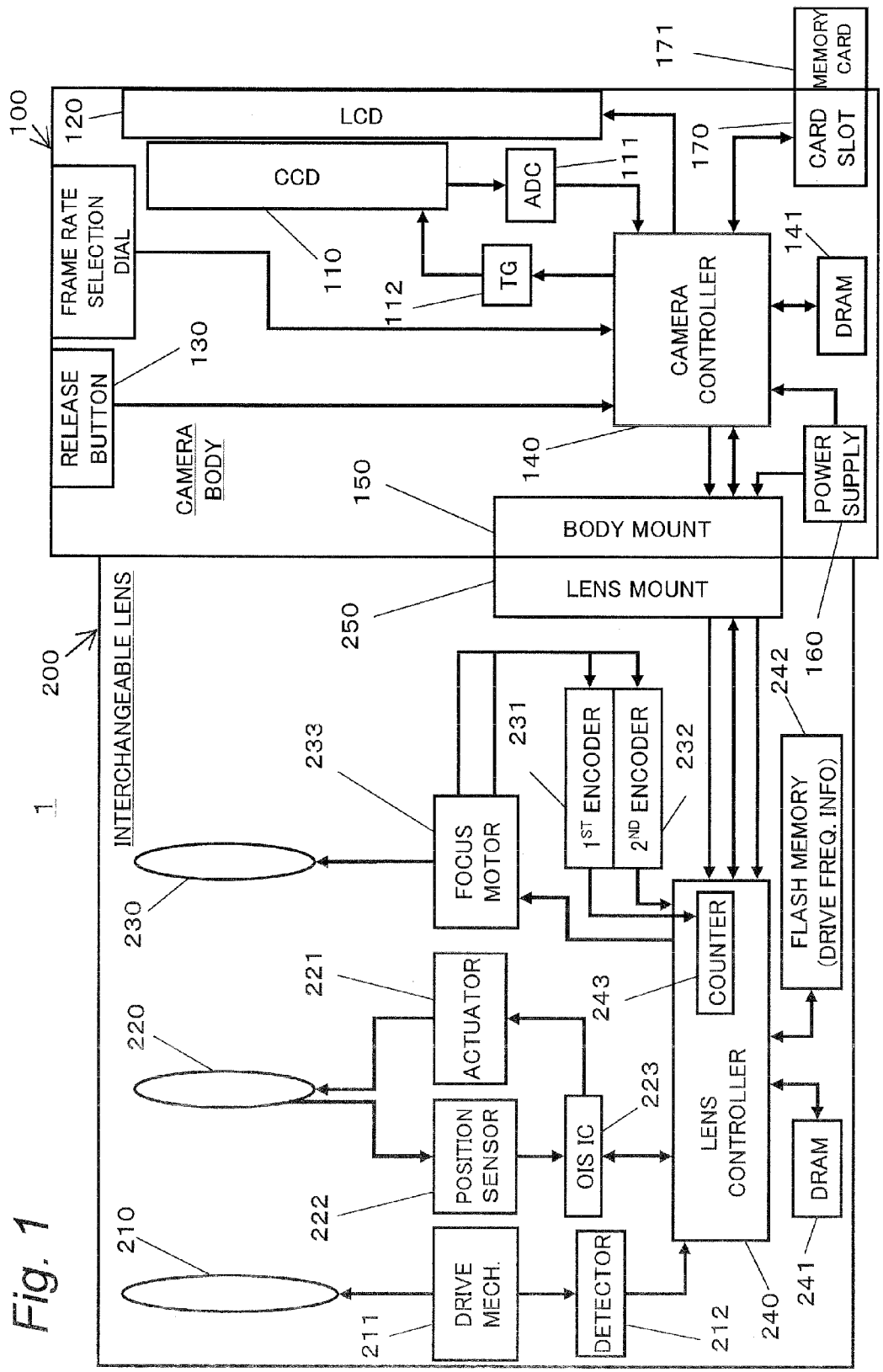
FIG. 1 is a block diagram of a camera system according to a first embodiment.

FIG. 1 is a block diagram showing a configuration of a camera system according to a first embodiment of the present invention. A camera system 1 includes a camera body 100 and an interchangeable lens 200 that is mountable to the camera body 100. The camera system 1 can generate moving image data by periodically capturing image data with a CCD image sensor 110. The camera system of the present embodiment can achieve suitable lens drive control in accordance with a frame rate that can be supported by the interchangeable lens 200 in capturing a moving image.

1-1-2. Configuration of Camera Body

The camera body 100 includes the CCD image sensor 110, a liquid crystal display monitor 120, a camera controller 140, a body mount 150, a power supply 160, and a card slot 170.

The camera controller 140 controls components such as the CCD image sensor 110 in accordance with an instruction from an operational member such as a release button 130 to control the operation of the entire camera system 1. The camera controller 140 sends a vertical synchronizing signal to a timing generator 112. Concurrently, the camera controller 140 generates an exposure synchronizing signal. The camera controller 140 periodically sends the generated exposure synchronizing signal to a lens controller 240 through the body mount 150 and a lens mount 250. The camera controller 140 uses DRAM 141 as working memory in performing any control operation or image processing operation.

The CCD image sensor 110 generates image data by capturing a subject image being incident through the interchangeable lens 200. In other words, the CCD image sensor 110 performs exposures at a predetermined timing to capture a subject image and generate image data. The generated image data is digitized by an AD converter 111. The digitized image data is subject to predetermined image processing performed by camera controller 140. The predetermined image processing includes, for example, a gamma correction process, a white balance adjustment process, a flaw correction process, a YC conversion process, an electronic zoom process, and a JPEG compression process.

The CCD image sensor 110 operates at a timing controlled by the timing generator 112. The operations of the CCD image sensor 110 include an operation of capturing a still image, an operation of capturing a through image, and the like.

Here, in capturing a moving image, the CCD image sensor 110 operates at the timing corresponding to the frame rate selected by a frame rate selection dial 131. That is, the frame rate selection dial 131 receives an instruction from a user as to a frequency of the CCD image sensor 110 to capture a subject image (imaging frequency).

A through image is mainly a moving image and is displayed on the liquid crystal display monitor 120 for the user to determine composition for taking a still image.

The liquid crystal display monitor 120 displays an image represented by image data for display subject to the image processing performed by the camera controller 140. The liquid crystal display monitor 120 can selectively display both a moving image and a still image.

The card slot 170 can be loaded with a memory card 171. The card slot 170 controls the memory card 171 under control of the camera controller 140. The memory card 171 can store image data generated by the image processing performed by the camera controller 140. For example, the memory card 171 can store JPEG image files. Further, the image data or image file stored in the memory card 171 can be read, and the image data or image file read from the memory card 171 are subject to the image processing performed by the camera controller 140. For example, the camera controller 140 decompresses the image data or image file obtained from the memory card 171 to generate image data for display.

The power supply 160 supplies power to be consumed by the camera system L. The power supply 160 may be, for example, a dry battery, or a rechargeable battery. Alternatively, the power supply 160 may externally supply power through a power cord to the camera system 1.

The body mount 150 can mechanically and electrically be connected to the lens mount 250 of the interchangeable lens 200. The body mount 150 can send and receive data to and from the interchangeable lens 200 through the lens mount 250. The body mount 150 sends an exposure synchronizing signal which is received from the camera controller 140 to the lens controller 240 through the lens mount 250. The body mount 150 also sends other control signals which are received from the camera controller 140 to the lens controller 240 through the lens mount 250. For example, the body mount 150 sends control information related to a drive frequency of the focus lens 230, which is received from the camera controller 140, to the lens controller 240 through the lens mount 250. The body mount 150 also sends a signal which is received from the lens controller 240 through the lens mount 250, to the camera controller 140. For example, the body mount 150 receives drive frequency information (described in detail later) of the focus lens 230 in the interchangeable lens 200 from the lens controller 240 through the lens mount 250, and sends the received drive frequency information to the camera controller 140. That is, the camera controller 140 obtains the drive frequency information from the interchangeable lens 200. The body mount 150 supplies the power received from the power supply 160 to the entire interchangeable lens 200 through the lens mount 250.

1-1-3. Configuration of Interchangeable Lens

The interchangeable lens 200 includes an optical system, the lens controller 240, and the lens mount 250. The optical system includes a zoom lens 210, an OIS lens 220 (camera shake correction lens (optical image stabilizer)), and a focus lens 230.

The zoom lens 210 is a lens for changing the magnification of a subject image formed at the optical system. The zoom lens 210 includes a single or a plurality of lenses. The drive mechanism 211 includes a zoom ring that can be operated by the user, and the like. The drive mechanism 211 transfers the operation of the user to the zoom lens 210 to move the zoom lens 210 in the optical axis direction of the optical system. The detector 212 detects an amount of drive of the drive mechanism 211. The lens controller 240 can recognize the zoom magnification of the optical system by obtaining the detection result from the detector 212.

The CIS lens 220 is a lens for correcting a blur of a subject image formed at the optical system of the interchangeable lens 200. The OIS lens 220 moves in the direction to cancel out the shake of the camera system 1, thereby reducing the blur of the subject image formed on the CCD image sensor 110. The OIS lens 220 includes a single or a plurality of lenses. An actuator 221 is controlled by an IC 223 for OIS to drive the OIS lens 220 in a plane perpendicular to the optical axis of the optical system. The actuator 221 can be implemented by, for example, a magnet and a planar coil. A position detection sensor 222 is a sensor that detects the position of the OIS lens 220 on a plane perpendicular to the optical axis of the optical system. The position detection sensor 222 can be implemented by, for example, a magnet and a Hall element. The IC 223 for OIS controls the actuator 221 based on a detection result of the position detection sensor 222 and a detection result of a camera shake detector such as a gyro sensor. The IC 223 for OIS obtains the detection result of the camera shake detector, from the lens controller 240. Further, the IC 223 for OIS sends, to the lens controller 240, a signal that represents the state of an optical image blur correction process.

The focus lens 230 is a lens for changing with the optical system the focus state of a subject image formed on the CCD image sensor 110. The focus lens 230 includes a single or a plurality of lenses.

A focus motor 233 drives the focus lens 230 to move forward and backward along the optical axis of the optical system based on the control of the lens controller 240. Thus, the focus state of the subject image formed on the CCD image sensor 110 through the optical system can be changed. In the present embodiment, a DC motor can be used as the focus motor 233. However, the present invention is not limited thereto, and the focus motor 233 can be implemented by a stepping motor, a servo motor, an ultrasonic motor, or the like.

A first encoder 231 and a second encoder 232 are each a conventional optical encoder structured with a rotating member and a photocoupler, and detect the rotation of the focus motor 233. The lens controller 240 counts detection signals from the first and second encoders 231 and 232 with a counter 243 installed therein. Respective detection signals of the first encoder 231 and the second encoder 232 are out of phase with each other. Therefore, by counting the detection signals of the first encoder 231 and the detection signals of the second encoder 232 in combination, the rotation direction of the focus motor 233 can be detected. The lens controller 240 can recognize a move amount or the position of the focus lens by the value of the counter 243.

The lens controller 240 controls the focus motor 233 in a first control mode or a second control mode. In the first control mode, the lens controller 240 controls the focus motor 233 using only the detection signals from the first encoder 231. Because only the detection signals from the first encoder 231 are used in the first control mode, the rotation direction of the focus motor 233 cannot be detected. On the other hand, in the second control mode, the lens controller 240 controls the focus motor 233 using the first encoder 231 and the second encoder 232. In the second control mode, the lens controller 240 can also detect the drive direction of the focus lens 230.

The lens controller 240 controls the IC 223 for OIS, the focus motor 233 and the like based on a control signal from the camera controller 140, thereby controlling the entire interchangeable lens 200. Further, the lens controller 240 receives signals from the detector 212, the IC 223 for OIS, the first encoder 231, the second encoder 232 and the like, and sends the signals to the camera controller 140. The data exchange between the lens controller 240 and the camera controller 140 is performed through the lens mount 250 and the body mount 150. The lens controller 240 uses DRAM 241 as working memory in exerting control. Further, flash memory 242 stores programs, parameters and the like for use in control exerted by the lens controller 240.

Here, the parameters stored in the flash memory 242 include drive frequency information of the focus lens 230 in the interchangeable lens 200. The drive frequency information is information on an operation frequency at which the focus lens 230 is caused to periodically move forward and backward along the optical axis (hereinafter, such an operation is referred to as "wobbling operation") for an autofocus operation in capturing a moving image. For example, an interchangeable lens capable of capturing a moving image at a plurality of frame rates is required to move the focus lens forward and backward along the optical axis at a plurality of types of frequencies. Accordingly, in this case, the flash memory 242 stores a plurality of pieces of drive frequency information. The drive frequency information stored in the flash memory 242 will be described in more detail below.

1-1-4. Drive Frequency Information

FIGS. 2A and 2B are schematic diagrams for describing the drive frequency information of the focus lens 230 according to the present embodiment.

The camera body 100 according to the present embodiment can capture a moving image at two types of frame rate, namely 59.94 (field/sec) and 24 (frame/sec). Here, 59.94 (field/sec) is a frame rate of a moving image complying with the NTSC (National Television Standards Committee) standard. In the present embodiment, a mode for capturing a moving image at 59.94 (field/sec) is referred to as "a normal mode", and a mode for capturing a moving image at 24 (frame/sec) is referred to as "a cinema mode". It is noted that the normal mode captures a moving image an interlace format, and the cinema mode captures a moving image in a progressive format. It is further noted that one frame corresponds to two fields.

Here, an autofocus method for a subject image in capturing a moving image using the camera system 1 will be described. Every time the camera system 1 captures an image of one field (in the normal mode) or one frame (in the cinema mode), the camera system 1 performs an operation to move the focus lens 230 forward and backward along the optical axis (the wobbling operation). For example, when capturing a moving image in the normal mode, as shown in FIG. 2A, the camera system 1 moves the focus lens 230 forward and backward along the optical axis at a frequency of 29.97 (Hz). Further, when capturing a moving image in the cinema mode, as shown in FIG. 2B, the camera system 1 moves the focus lens 230 forward and backward along the optical axis at a frequency of 12 (Hz). Every time the camera system 1 captures an image of one field (in the normal mode) or one frame (in the cinema mode) and generates image data, the camera system 1 calculates an evaluation value for the autofocus operation of the generated image data (hereinafter, referred to as "the AF evaluation value"). Specifically, a brightness signal is obtained based on the image data generated by the CCD image sensor 110. Then, high frequency components of the brightness signal in the screen are accumulated to obtain the AF evaluation value.

In this manner, every time the camera system 1 generates image data of two fields (in the normal mode) or two frames (in the cinema mode), the camera system 1 calculates an AF evaluation value for each of the state in which the focus lens 230 is shifted from the current position toward the subject along the optical axis direction and the state in which the focus lens 230 is shifted toward the CCD image sensor 110. By comparing these two AF evaluation values with each other, the camera system 1 determines whether the focus lens 230 should be shifted from the current position toward the subject or toward the CCD image sensor 110 in the following period. By moving the focus lens 230 forward and backward along the optical axis in this manner, the camera system 1 can continuously focus on the subject image in capturing a moving image.

Meanwhile, in order to drive the focus lens 230 at a predetermined frequency as described above, it is necessary to store in advance a program for driving the focus motor 233 at a predetermined frequency in the flash memory 242 of the interchangeable lens 200. On the other hand, the camera body 100 can be mounted with a variety of interchangeable lenses. For example, it is also possible to be mounted with an interchangeable lens that does not support a drive frequency of (Hz) of the focus lens. In such a case, if the camera body 100 instructs the interchangeable lens to move the focus lens forward and backward along the optical axis at 12 (Hz), then there arises a possible risk of malfunction of the interchangeable lens.

Accordingly, in the present embodiment, the interchangeable lens 200 stores information (drive frequency information) on a drivable frequency to move the focus lens 230 forward and backward along the optical axis in the flash memory 242. For example, when the interchangeable lens 200 is drivable along the optical axis at two frequencies, namely 12 (Hz) and 29.97 (Hz), the drive frequency information indicating that the interchangeable lens 200 supports two types of drive frequency of 12 (Hz) and 29.97 (Hz) is stored in the flash memory 242. Storing the drive frequency information in the flash memory 242 in this manner allows the interchangeable lens 200 to inform in advance the camera body 100 of the drive frequency of the focus lens 230 which the interchangeable lens 200 can support.

Further, by making it possible to drive the focus lens 230 at two types of frequencies of 12 (Hz) and 29.97 (Hz), the camera system 1 is allowed to capture a moving image at two types of frame rate. It is noted that, in the present embodiment, information that represents numerical values themselves, such as 12 (Hz) and 29.97 (Hz), is stored in the flash memory 242 as the drive frequency information.

The focus lens 230 is one example of a focus lens. The focus motor 233 is one example of a driving unit. The lens controller 240 is one example of a lens controller. The flash memory 242 is one example of a storage unit. The CCD image sensor 110 is one example of an imaging unit. The frame rate selection dial 131 is one example of a receiving unit. The combination including the camera controller 140 and the body mount 150 is one example of an obtaining unit. The camera controller 140 is one example of a body controller. The liquid crystal display monitor 120 is one example of a display unit.

1-2. Operation 1-2-1. Imaging Preparation Operation

An operation of the camera system 1 in preparation for capturing an image will be described. FIG. 3 shows signal sending and receiving in the imaging preparation operation of the camera system 1.

In a state where the interchangeable lens 200 is mounted to the camera body 100, when the user turns on the camera body 100, the power supply 160 supplies power to the interchangeable lens 200 through the body mount 150 and the lens mount 250 (S11). Next, the camera controller 140 requests authentication information of the interchangeable lens 200 from the lens controller 240 (S12). Here, the authentication information of the interchangeable lens 200 includes information on whether or not the interchangeable lens 200 is mounted and information on whether or not accessories are mounted. The lens controller 240 responds to the lens authentication information request from the camera controller 140 (S13).

Next, the camera controller 140 requests the lens controller 240 to perform an initialization operation (S14). In response thereto, the lens controller 240 performs the initialization operation, such as reset a diaphragm and reset of the CIS lens 220. Then, the lens controller 240 sends to the camera controller 140 a response indicating that the lens initialization operation has been completed (S15).

Next, the camera controller 140 requests lens data from the lens controller 240 (S16). The lens data is stored in the flash memory 242. The lens controller 240 reads lens data from the flash memory 242, and sends the lens data to the camera controller 140 (S17). Here, the lens data is a characteristic value specific to the interchangeable lens 200, such as a lens name, F-number, a focal length and the like.

In particular, in the present embodiment, the lens data includes drive frequency information. This makes it possible for the camera body 100 to obtain the drive frequency information on the drive frequency of the focus lens 230 supported by the interchangeable lens 200 at the imaging preparation stage. That is, the camera body 100 can obtain, at this stage, the information indicating that the interchangeable lens 200 can move the focus lens 230 forward and backward along the optical axis at two types of drive frequencies, namely 12 (Hz) and 29.97 (Hz).

When the camera controller 140 recognizes the lens data of the interchangeable lens 200 mounted to the camera body 100, the camera controller 140 becomes in a state capable of capturing an image. In this state, the camera controller 140 requests periodically the lens state data indicative of the state of the interchangeable lens 200 from the lens controller 240 (S18). The lens state data includes, for example, zoom magnification information attained by the zoom lens 210, positional information of the focus lens 230, aperture value information and the like. In response to the request, the lens controller 240 sends the requested lens state data to the camera controller 140 (S19).

1-2-2. Operation of Capturing Moving Image

Figure 4:
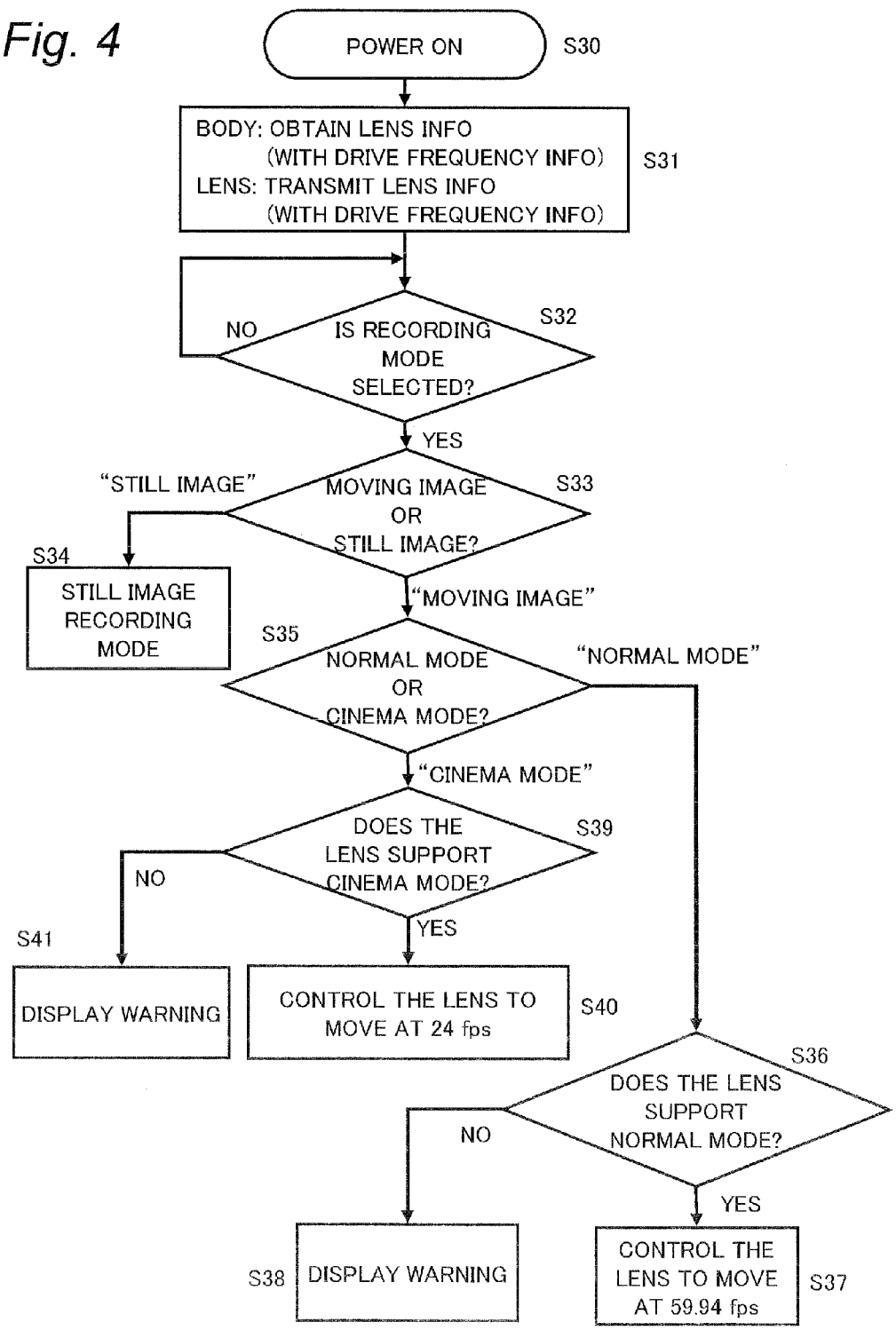
FIG. 4 is a flowchart of an operation of recording a moving image.

A description will be given of the operation of capturing a moving image performed by the camera system 1 having completed the imaging preparation in the above manner, with reference to FIG. 4. FIG. 4 is a flowchart related to control of the camera system 1 in capturing a moving image with the camera system 1.

At the imaging preparation stage, when the power supply of the camera body 100 is turned on (S30), the camera body 100 obtains the drive frequency information of the focus lens 230 from the interchangeable lens 200 (S31). At this stage, the camera body 100 stands by until a recording mode is selected by the user (S32). Here, the recording mode refers to a mode for shooting a still image or a mode for shooting a moving image.

When the recording mode is selected by the user, the camera controller 140 determines whether the selected recording mode is a still image recording mode or a moving image recording mode (S33).

When it is determined to be the still image recording mode, the camera body 100 shifts to the still image recording mode, and stands by until the release button 130 is pressed down by the user (S34).

When it is determined to be the moving image recording mode, the camera controller 140 determines whether the recording mode selected with the frame rate selection dial 131 is a normal mode or a cinema mode (S35).

When it is determined to be the normal mode, the camera controller 140 determines whether or not the mounted interchangeable lens 200 can support the normal mode (S36). This determination is made by referring to the drive frequency information obtained from the interchangeable lens 200 at the imaging preparation stage. Specifically, when the drive frequency information indicates that the interchangeable lens 200 is operable at 29.97 (Hz), which is the wobbling frequency in the normal mode, it is determined that the interchangeable lens supports the normal mode.

When it is determined that the interchangeable lens 200 supports the normal mode, the camera controller 140 controls the CCD image sensor 110 to capture a moving image at 59.94 (field/sec) (S37). Further, the camera controller 140 sends a control signal instructing the lens controller 240 to move the focus lens 230 forward and backward along the optical axis at 29.97 (Hz), to the lens controller 240 (S37). In other words, when a drive frequency of 29.97 (Hz) corresponding to the normal mode selected by the user agrees with any of pieces of the drive information indicated by the drive frequency information obtained from the interchangeable lens 200, the camera controller 140 controls the CCD image sensor 110 to capture the subject image at 59.94 (field/sec) indicated by the normal mode, and sends the interchangeable lens 200 a control signal instructing to drive the focus lens 230 at a drive frequency of 29.97 (Hz) corresponding to the normal mode. Thus, in the present embodiment, with respect to the interchangeable lens 200 supporting the normal mode, the camera controller 140 outputs a control signal to the lens controller 240 to drive the focus lens 230 at a drive frequency corresponding to the normal mode. In this manner, only when an interchangeable lens that can support a frame rate instructed by the user is mounted, the focus lens can be controlled at the drive frequency corresponding to the frame rate instructed by the user.

Figure 5:
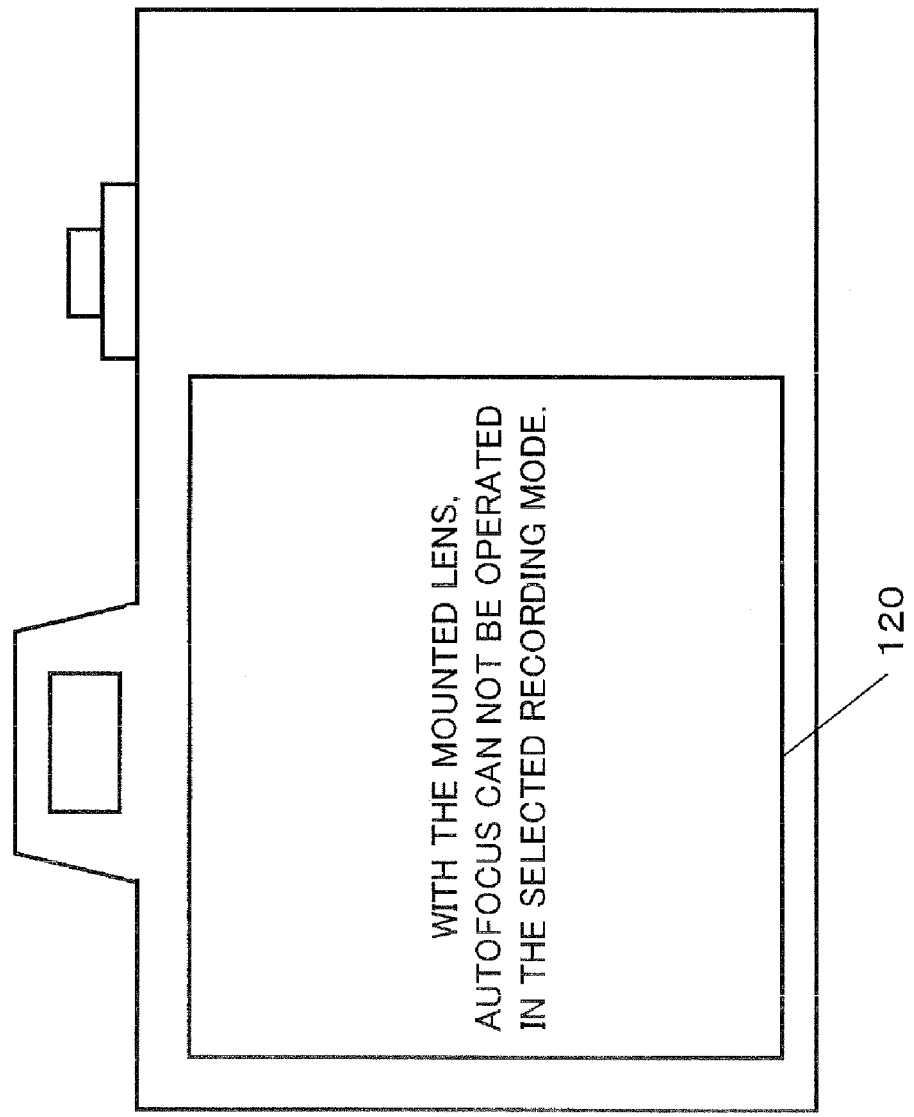
FIG. 5 is a diagram showing a display example of a warning message.

On the other hand, when it is determined that the interchangeable lens 200 does not support the normal mode, the camera controller 140 controls the liquid crystal display monitor 120 to display a warning (S38). In this case, because the wobbling operation for carrying out the autofocus operation cannot be performed, a warning is displayed, such as shown in FIG. 5, indicating that an autofocus operation is impossible. In this manner, when the currently mounted interchangeable lens does not support the normal mode (for example, in a case where a lens that does not support autofocus in capturing a moving image is mounted), the camera body 100 informs the user that the autofocus operation is impossible through the display on the liquid crystal display monitor 120. This warning allows the user to recognize that the currently mounted interchangeable lens cannot achieve the autofocus operation in the normal mode, and perform the manual operation as necessary. Further, the camera body 100 does not instruct the interchangeable lens 200 to perform the autofocus operation. Accordingly, a possible risk of malfunction of the interchangeable lens not supporting the normal mode can be suppressed.

In the present embodiment, it is configured that, when an interchangeable lens not supporting the selected normal mode is mounted to the camera body 100, the camera body 100 displays a warning through the liquid crystal display monitor 120 and does not issue an instruction to move the focus lens forward and backward along the optical axis at the non-supported drive frequency. However, the present embodiment is not limited to such a configuration. For example, when an interchangeable lens not supporting the normal mode is mounted, a moving image may be captured by manually controlling the focus. This allows a moving image to be captured even in a case where an interchangeable lens not supporting the normal mode is mounted. Further, in a case where an interchangeable lens not supporting the normal mode is mounted, the moving image may be captured while adjusting the focus based on a drive amount of the focus lens which is informed successively by the camera body to the interchangeable lens. This allows a moving image to be captured while adjusting the focus, even in a case where an interchangeable lens not supporting the normal mode is mounted.

Returning to FIG. 4, in step S35, when the recording mode selected with the frame rate selection dial 131 is determined to be the cinema mode, the camera controller 140 determines whether or not the currently mounted interchangeable lens 200 can support the cinema mode (S39). This determination is made based on the drive frequency information obtained at the imaging preparation stage from the interchangeable lens 200. Specifically, when the drive frequency information indicates that the interchangeable lens 200 is drivable at (Hz), which is the wobbling frequency in the cinema mode, it is determined that the interchangeable lens 200 supports the cinema mode.

When it is determined that the interchangeable lens 200 supports the cinema mode, the camera controller 140 controls the CCD image sensor 110 to capture a moving image at 24 (frame/sec) (S40). Further, the camera controller 140 instructs the lens controller 240 to move the focus lens 230 forward and backward along the optical axis at (Hz) (S40). Thus, in the present embodiment, when the interchangeable lens 200 supports the cinema mode, the camera controller 140 sends a control signal to the lens controller 240 instructing it to drive the focus lens 230 at a drive frequency supporting the cinema mode. In this manner, only when the interchangeable lens that can support the frame rate instructed by the user is mounted, the focus lens can be controlled at a drive frequency corresponding to the frame rate instructed by the user.

Figure 6:
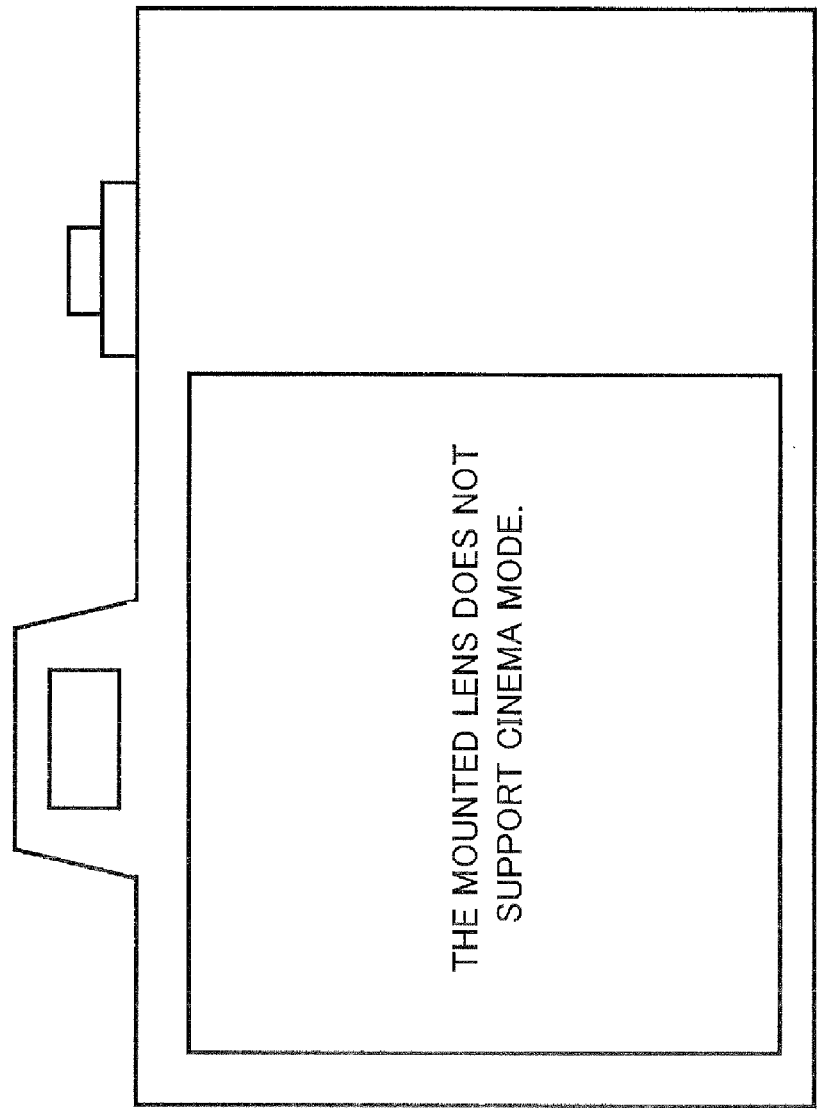
FIG. 6 is a diagram showing a display example of a warning message.

On the other hand, when it is determined that the interchangeable lens 200 does not support the cinema mode, the camera controller 140 controls the liquid crystal display monitor 120 to display a warning (S41). FIG. 6 shows an example of the warning display. In this manner, when the currently mounted interchangeable lens does not support the cinema mode, the camera body 100 informs the user of the fact through the display on the liquid crystal display monitor 120. This warning allows the user to recognize that the currently mounted interchangeable lens does not support the cinema mode. Further, the camera body 100 does not instruct the interchangeable lens to move the focus lens 230 forward and backward along the optical axis at the drive frequency which is not supported by the interchangeable lens. Accordingly, a possible risk of malfunction of the interchangeable lens not supporting the cinema mode can be suppressed.

In the first embodiment, it is configured that, when an interchangeable lens not supporting the cinema mode is mounted, the camera body 100 displays a warning through the liquid crystal display monitor 120, and does not issue an instruction to move the focus lens forward and backward along the optical axis at the non-supported drive frequency. However, the present embodiment is not limited to such an arrangement. For example, when an interchangeable lens not supporting the cinema mode is mounted, a moving image may be captured by manually controlling the focus. This allows a moving image to be captured even in a case where an interchangeable lens not supporting the selected moving image recording mode is mounted. Further, in a case where an interchangeable lens not supporting the cinema mode is mounted, the moving image may be captured while adjusting the focus based on a drive amount of the focus lens which is successively informed by the camera body. This allows a moving image to be captured while adjusting the focus, even in a case where an interchangeable lens not supporting the cinema mode is mounted. Further, in a case where an interchangeable lens not supporting the cinema mode but supporting the normal mode is attached, a moving image may be captured by switching the mode to the normal mode instead of the cinema mode. This allows a moving image to be captured while adjusting the focus, even in a case where an interchangeable lens not supporting the cinema mode is mounted.

Other Embodiments

In the foregoing, the first embodiment has been described as one embodiment of the present invention. However, the embodiments of the present invention are not limited thereto. In the following, other embodiments will be described.

In the first embodiment, the camera body 100 is capable of capturing a moving image at a frame rate of 59.94 (field/sec) in the normal mode. However, the frame rate in the normal mode is not limited thereto. Specifically, the camera body 100 may be configured to be capable of capturing a moving image at a frame rate of 50 (field/sec). This allows the camera body 100 to capture a moving image complying with the PAL standard. Further, the camera body 100 may support both the frame rates, i.e., 59.94 (field/sec) and 50 (field/sec).

In the first embodiment, the camera body 100 is capable of capturing a moving image at 24 (frame/sec) in the cinema mode. However, the frame rate of the cinema mode is not limited thereto. Specifically, it is also possible to define the mode of capturing a moving image at a frame rate such as 25 (frame/sec), 26 (frame/sec), 30 (frame/sec) or the like, as the cinema mode.

In the first embodiment, the drive program is stored in the flash memory 242 of the interchangeable lens 200. However, the present embodiment is not limited thereto. Specifically, a dedicated storage medium for storing the drive program may be provided to the interchangeable lens 200 to store the program therein.

In the first embodiment, the focus lens 230 is always caused to perform the wobbling operation when capturing a moving image. However, the present embodiment is not limited thereto. Specifically, it may also be possible to prepare the autofocus control and the manual focus control as the methods for controlling the focus lens in capturing a moving image. In such a case, the control shown in the first embodiment may be exerted when the autofocus control mode is selected.

In the first embodiment, the configuration of the interchangeable lens 200 is exemplarily shown as having the zoom lens 210 and the OIS lens 220. However, these are not the essential matters. Specifically, the idea of the first embodiment is also applicable to a camera system mounted with a single focus lens without the zoom function. Further, the idea of the first embodiment is also applicable to a camera system mounted with an interchangeable lens without the camera shake correction function (image stabilizer).

In the first embodiment, the camera body without a movable mirror has been exemplarily shown. However, the camera body may house therein a movable mirror. Further, the camera body may house therein a prism for separating the subject image. Still further, the movable mirror may be housed not inside the camera body but inside an adaptor.

In the first embodiment, the CCD image sensor 110 has been exemplarily shown as an imaging device. However, the imaging device is not limited thereto. For example, the imaging device may be a CMOS image sensor or an NMOS image sensor.

In the first embodiment, as the drive frequency information, information such as 12 (Hz) and 29.97 (Hz) that represents the numerical values themselves is used. However, the expression of the drive frequency information is not limited thereto. For example, the drive frequency may be expressed by codes. Specifically, it is also possible to previously define that "01" represents 12 (Hz) and "10" represents 29.97 (Hz). Then, the drive frequency information as being expressed as the codes such as "01" and "10" may be stored in the flash memory 242. In this manner, the storage capacity consumed on the flash memory 242 can be reduced.

In the first embodiment, one wobbling frequency is set to the imaging frequency (hereinafter referred to as "the control frequency") of the CCD image sensor 110. Specifically, a frequency which is half of the control frequency is set as the wobbling frequency. However, a plurality of wobbling frequencies may be set to one control frequency. For example, the frequencies one-half, one-fourth, or one-eighth of the control frequency may be set as the wobbling frequency. The drive frequency information in such a case may be expressed by information indicative of a ratio to the control frequency. A specific example in such a situation will be described below.

FIG. 7 shows a configuration of control frequency support flags showing control frequencies or wobbling frequencies that the interchangeable lens can support. Such control frequency support flags may be sent as lens data from the interchangeable lens 200 to the camera body 100. The control frequency support flags are composed of 15 bits, each bit composing a flag. Each of the first to twelfth bits is a flag indicative of whether or not the interchangeable lens 200 supports the control frequency corresponding to each flag. Each of the thirteenth to fifteenth bits is a flag indicative of whether or not the interchangeable lens 200 can perform the wobbling operation at a frequency one-nth (n=2, 4, and 8) of the supported control frequency. Every flag has the value 1 representing "supported", and the value 0 representing "not supported". For example, when the 60 Hz control frequency support flag as the second bit and the ½ wobbling frequency support flag as the thirteenth bit are both "1", the interchangeable lens 200 is drivable at a control frequency of 60 Hz, and is capable of performing the wobbling operation at half (30 Hz) of the control frequency. In this case, the 1/n wobbling frequency support flag (n 2, 4, and 8) as the thirteenth to fifteenth bits correspond to the drive frequency information.

In the first embodiment, the image data captured at an imaging frequency of 24 (frame/sec) (cinema mode) is recorded as the image data of 24 (frame/sec), and the image data captured at an imaging frequency of 59.94 (field/sec) (normal mode) is recorded as the image data of 59.94 (field/sec). However, the present embodiment may not necessarily have such a structure. For example, the image data captured at an imaging frequency of 24 (frame/sec) may be recorded as the image data of 60 (field/sec). Specifically, while capturing at an imaging frequency of 24 (frame/sec), by performing a process of distributing the captured two frames into five fields (a so-called 2-3 pull-down process), the image data of 60 (field/sec) may be generated. In this manner, based on the image data captured at an imaging frequency of 24 (frame/sec), the image data of 60 (field/sec) can be generated. As a result, even when an interchangeable lens that can only support the wobbling at the frequency corresponding to an imaging frequency of 24 (frame/sec) is mounted to the camera body, the camera body can generate the image data of 60 (field/sec) while exerting the wobbling control over the interchangeable lens.

INDUSTRIAL APPLICABILITY

The present invention is applicable to an interchangeable lens mountable to a camera body, a camera body to which an interchangeable lens is mountable, and an interchangeable lens type camera system. Specifically, the present invention can be applied to a digital still camera, a movie camera, and the like.

DESCRIPTION OF REFERENCE SIGNS

1 Camera system
100 Camera body
110 CCD image sensor
112 Timing generator 130 Release button
140 Camera controller
200 Interchangeable lens
230 Focus lens
231 First encoder
232 Second encoder
233 Focus motor
240 Lens controller

The invention claimed is:

1. An interchangeable lens mountable to a camera body, comprising:
   a focus lens configured to change a focus state of a subject image;
   a driving unit configured to drive the focus lens along an optical axis;
   a lens controller configured to control the driving unit to move the focus lens forward and backward at a predetermined drive frequency along the optical axis;
   a storage unit configured to store drive frequency information indicating a drive frequency at which the driving unit can drive the focus lens; and
   a sending unit configured to send the drive frequency information to the camera body.

2. The interchangeable lens according to claim 1, wherein the storage unit stores the drive frequency information on a plurality of types of drive frequencies.

3. The interchangeable lens according to claim 1, wherein the lens controller is configured to control such that the drive frequency information stored in the storage unit is sent to the camera body through the sending unit in response to a request from the camera body.

4. A camera body to which an interchangeable lens is mountable, the interchangeable lens including a focus lens and storing drive frequency information indicative of a drive frequency for driving the focus lens to move forward and backward along an optical axis, the camera body comprising:
   an imaging unit configured to capture a subject image at a predetermined imaging frequency;
   a receiving unit configured to receive an instruction as to the predetermined imaging frequency;
   an obtaining unit configured to obtain the drive frequency information from the interchangeable lens; and
   a body controller configured to refer to the drive frequency information obtained by the obtaining unit, determine whether the focus lens can be driven at a drive frequency corresponding to the predetermined imaging frequency indicated by the instruction received by the receiving unit, and control an operation of the camera body in accordance with a result of the determination.

5. The camera body according to claim 4, further comprising a sending unit configured to send a control signal to the interchangeable lens for controlling the focus lens,
   wherein the body controller controls the sending unit to send the control signal to the interchangeable lens in accordance with the result of the determination.

6. The camera body according to claim 5, wherein
   when the body controller, referring to the obtained drive frequency information, determines that the focus lens can be driven at the drive frequency corresponding to the predetermined imaging frequency indicated by the received instruction, the body controller controls the imaging unit to capture the subject image at the predetermined imaging frequency indicated by the received instruction, and further controls the sending unit to send a control signal for driving the focus lens at the drive frequency corresponding to the predetermined imaging frequency indicated by the received instruction to the interchangeable lens.

7. The camera body according to claim 4, further comprising a display unit capable of displaying warning information,
   wherein when the body controller referring to the obtained drive frequency information determines that the focus lens can not be driven at the drive frequency corresponding to the predetermined imaging frequency indicated by the received instruction, the body controller controls the display unit to display the warning information.

8. The camera body according to claim 4, further comprising a sending unit configured to send a control signal to the interchangeable lens for driving the focus lens at the drive frequency corresponding to the predetermined imaging frequency indicated by the received instruction,
   wherein when the body controller, referring to the obtained drive frequency information, determines that the focus lens can not be driven at the drive frequency corresponding to the predetermined imaging frequency indicated by the received instruction, the body controller controls the sending unit to be prevented from sending the control signal to the interchangeable lens.

9. The camera body according to claim 4, further comprising a sending unit configured to send a reset signal to the interchangeable lens for requesting the drive frequency information,
   wherein the body controller controls the sending unit to send the request signal.

10. A camera system comprising an interchangeable lens and a camera body,
   the interchangeable lens comprising:
      a focus lens configured to change a focus state of a subject image;
      a driving unit configured to drive the focus lens along an optical axis;
      a lens controller configured to control the driving unit to move the focus lens forward and backward at a predetermined drive frequency along the optical axis; and
      a storage unit configured to store drive frequency information on a drive frequency at which the driving unit can drive the focus lens; and
      a sending unit configured to send the drive frequency information to the camera body,
   the camera body comprising:
      an imaging unit configured to capture a subject image at a predetermined imaging frequency;
      a receiving unit configured to receive an instruction related to the predetermined imaging frequency;
      a body controller configured to control the camera body,
   wherein
      the body controller requests the drive frequency information from the lens controller,
      the lens controller sends the drive frequency information to the body controller through the sending unit in response to the request from the body controller, and
      the body controller controls an operation of the camera body by referring to the received drive frequency information.

* * * * *